(12) United States Patent
Hudson

(10) Patent No.: US 8,325,590 B2
(45) Date of Patent: Dec. 4, 2012

(54) OFDM COMMUNICATIONS SYSTEM

(75) Inventor: John Hudson, Stansted (GB)

(73) Assignee: Apple Inc., Cupertino, CA (US)

( * ) Notice: Subject to any disclaimer, the term of this patent is extended or adjusted under 35 U.S.C. 154(b) by 2965 days.

(21) Appl. No.: 10/185,133

(22) Filed: Jun. 27, 2002

(65) Prior Publication Data

US 2003/0165113 A1 Sep. 4, 2003

Related U.S. Application Data

(60) Provisional application No. 60/359,973, filed on Feb. 27, 2002.

(51) Int. Cl.
*H04J 11/00* (2006.01)
(52) U.S. Cl. ......... 370/208; 370/252; 375/130; 375/148
(58) Field of Classification Search .................. 370/208, 370/203, 210, 503, 509, 514
See application file for complete search history.

(56) References Cited

U.S. PATENT DOCUMENTS

| | | | | | |
|---|---|---|---|---|---|
| 5,987,011 | A * | 11/1999 | Toh | .............................. | 370/331 |
| 6,175,550 | B1 * | 1/2001 | van Nee | ....................... | 370/206 |
| 6,377,632 | B1 * | 4/2002 | Paulraj et al. | ................ | 375/299 |
| 6,553,540 | B1 * | 4/2003 | Schramm et al. | ............ | 714/790 |
| 6,640,087 | B2 * | 10/2003 | Reed et al. | ................... | 455/11.1 |
| 6,714,511 | B1 * | 3/2004 | Sudo et al. | ..................... | 370/208 |
| 6,731,668 | B2 * | 5/2004 | Ketchum | ..................... | 375/130 |
| 7,133,352 | B1 * | 11/2006 | Hadad | ........................... | 370/208 |
| 7,167,526 | B2 * | 1/2007 | Liang et al. | ................... | 375/267 |
| 2002/0159537 | A1 * | 10/2002 | Crilly, Jr. | ...................... | 375/267 |
| 2002/0181438 | A1 * | 12/2002 | McGibney | ................... | 370/350 |
| 2003/0026360 | A1 * | 2/2003 | Ramasubramanian et al. | ............................ | 375/343 |
| 2003/0054829 | A1 * | 3/2003 | Moisio | .......................... | 455/452 |
| 2003/0157899 | A1 * | 8/2003 | Trossen et al. | .................. | 455/69 |
| 2003/0189894 | A1 * | 10/2003 | Nee | ................................. | 370/208 |
| 2004/0141548 | A1 * | 7/2004 | Shattil | ............................ | 375/146 |
| 2004/0203380 | A1 * | 10/2004 | Hamdi et al. | ................. | 455/41.2 |
| 2005/0220201 | A1 * | 10/2005 | Laroia et al. | ................... | 375/260 |
| 2007/0297382 | A1 * | 12/2007 | Webster et al. | ............... | 370/338 |
| 2008/0310484 | A1 * | 12/2008 | Shattil | ............................ | 375/146 |

FOREIGN PATENT DOCUMENTS

| | | | |
|---|---|---|---|
| EP | 1061687 | * | 12/2000 |
| WO | WO 97/30531 | * | 8/1997 |

OTHER PUBLICATIONS

IEEE Std 802.11-1997, Jun. 26, 1997.*
IEEE Std 802.11a-1999, Sep. 16, 1999.*

* cited by examiner

*Primary Examiner* — Chi Pham
*Assistant Examiner* — Mohammad Adhami
(74) *Attorney, Agent, or Firm* — Meyertons, Hood, Kivlin, Kowert & Goetzel, P.C.

(57) ABSTRACT

A communications system comprising a base station, and a plurality of terminals served by that base station which may include an ad-hoc network of terminals. Information from the base station or transmitting terminal is transported to the receiving terminals in the form of symbols in an orthogonal frequency division multiplexed format. Each terminal has means for measuring a channel dispersion and rate of phase variation corresponding to multipath signal reception for that terminal and for reporting that dispersion and variation measure to the transmitting station. In response to the channel dispersion and phase change measurements, the base station or transmitting terminal is arranged to provide, for groups of terminals having a similar channel dispersion, respective symbol and prefix lengths on the basis of the dispersion measurement of that group of terminals.

18 Claims, 6 Drawing Sheets

OFDM COMMUNICATIONS SYSTEM

RELATED APPLICATIONS

This application is the regular filing of provisional application No. 60/359,973 filed on 27 Feb. 2002, the contents of which are incorporated herein by reference.

FIELD OF THE INVENTION

This invention relates to communication systems and in particular to an arrangement and method for providing OFDM (Orthogonal Frequency Division Multiplex) communication.

BACKGROUND OF THE INVENTION

A number of wireless communication systems employ OFDM (Orthogonal Frequency Division Multiplex) transmission as a means of communication between a base station and a number of terminals served by that base station. OFDM downlink transmission from the base station to the terminals provides a series of symbols spread over a large number of carrier frequencies. Each of those symbols is provided with a cycle prefix which needs to be of sufficient length for the preceding symbol to have decayed thus minimising the risk of intersymbol interference.

In a typical wireless communication, this prefix length needs to be sufficient to overcome the effects of multipath transmission for those terminals that are relatively distant from the base station. It will be appreciated that multipath transmission can arise from reflections of the radio signal from objects adjacent the transmission path. Because these reflected signals reach their destination via paths that are longer than the direct 'line of sight' path, the received signal effectively comprises a number of identical signals having different time delays. The effect is referred to as channel dispersion.

In such a system, due account has to be taken of channel dispersion effects, particularly for terminals that are remote from the base station. In current systems a prefix length is chosen that will accommodate the higher degree of channel dispersion for outlying terminals. However, the 'worst case' prefix length that is necessary to provide effective downlink communication with a distant terminal is far longer than is necessary for communication with terminals close to the base station.

OFDM with cyclic prefixes exploits the eigenfunctions of a multipath channel and is therefore considered to be the most efficient signalling method in such environments. However there are technological issues involving the cost of the terminal FFT DSP (fast Fourier Transform digital signal processing) and the required stability of local oscillators. In fact, OFDM as currently implemented exploits the technology in a significantly less than inefficient fashion. This is because the duration of the cyclic prefixes is determined, as discussed above, by the worst case environment. In turn this fixes the symbol duration and sub-carrier bandwidths. When the overall channel bandwidth is fixed, the size of the FFT processing is also determined. This is typically in the 1024-4096 point region which is far too high for a typical user.

In a typical OFDM communications system, the worst case channel dispersion may be seen only by 1% of the terminals and the average channel may have a dispersion value only 1% to 10% of the worst case dispersion. Thus, in the current design paradigm, 1% of the terminals in an OFDM communications system are forcing the remaining 99% of the terminals to have symbol durations 10-100 times larger than is strictly necessary for adequate reception of signal transmissions. While this current method of system design has no significant impact on performance, there is a very significant impact on cost. High stability local oscillators with low phase noise are mandated in supposedly low cost terminals, and a much larger FFT (fast Fourier transform) is used than is ideally necessary which increases the DSP (digital signal processor) load and battery power consumption.

Another problem occurs in channels where the phase of the radio path is unstable due to Doppler shifts or other propagation anomalies. If the phase changes more than 10° or so during the duration of an OFDM symbol then the FFT algorithm used in the receiver, which by design assumes a perfect static channel, is mismatched to the symbol and there is a consequent loss of amplitude of each of the symbols in the frequency bins accompanied by the appearance of cross talk between the frequency bins. The combination of these effects reduces the signal to noise ratio (SNR) of the demodulated symbols and increases the probability of error in the communication channel.

The minimization of the joint problems of channel dispersion and phase instability requires the selection of OFDM symbols which have an intermediate length and which must be selected by in situ measurements in the channel as it is used.

OBJECT OF THE INVENTION

An object of the invention is to overcome or at least to mitigate the above disadvantage.

A further object of the invention is to provided an improved arrangement and method for providing OFOM communication between a central or base station and a plurality of terminals.

A further object of the invention is to provided an improved arrangement and method for providing OFDM communication between terminals in an ad-hoc network.

A further object of the invention is to provide an improved base station for an OFDM communications system.

SUMMARY OF THE INVENTION

According to a first aspect of the invention there is provided a method of communication between one or more base stations and a plurality of terminals served by the base station(s), the method comprising transporting information from the base station(s) to the terminals in the form of symbols in an orthogonal frequency division multiplexed format, and providing each symbol with a respective prefix, and wherein the symbol and prefix durations are arranged on the basis of the requirements of individual communication channels.

According to another aspect of the invention there is provided a method of communication between one or more base stations and a plurality of terminals served by the base station(s) and in which information from the base station(s) is transported to the terminals in the form of symbols in an orthogonal frequency division multiplexed format, the method comprising: at each terminal, measuring a channel dispersion corresponding to multipath signal reception for that terminal and reporting that dispersion measure to the base station(s), and, at the base station(s), providing for each terminal respective symbol and prefix lengths appropriate to the dispersion measurement of that group of terminals.

In a preferred arrangement, terminals with a given symbol and prefix length are grouped together and transmitted to as a group. It is preferred not to transmit OFDM symbols of differing durations at the same time, i.e. in the same time slot, as they will become non-orthogonal. Thus, the transmission will preferably have a time division multiple access (TDMA) format.

The method may be embodied in or controlled by software in machine readable form on a storage medium.

Advantageously, the prefix length is matched to the duration of the multipath in a channel. Typically, the useful symbol length is about ten times the prefix length.

In a further embodiment, when the prefix needed is longer than the symbol then the whole symbol itself is used several times to extend the symbol length by an integer number of times.

According to another aspect of the invention there is provided a communications system comprising one or more base stations, and a plurality of terminals served by the base station(s), in which information from the base station(s) is transported to the terminals in the form of symbols in an orthogonal frequency division multiplexed (OFDM) format, in which each terminal has means for measuring a channel dispersion corresponding to multipath signal reception for that terminal and for reporting that dispersion measure to the base station(s), and, in which the/each base station is arranged to provide, for groups of terminals having similar channel dispersion, respective symbol and prefix lengths appropriate to the dispersion measurement of that group of terminals.

According to another aspect of the invention there is provided a base station for use in a communications system in which information from the base station is transported to the terminals in the form of symbols in an orthogonal frequency division multiplexed (OFDM) format, the base station comprising: means for receiving channel dispersion measurements from terminals served by the base station, and means for providing, for groups of terminals having similar channel dispersion, respective symbol and prefix lengths appropriate to the dispersion measurement of that group of terminals.

According to another aspect of the invention there is provided a communications system comprising one or more base stations, and a plurality of terminals served by that one or more base stations, and wherein some of the terminals have formed an ad-hoc network in which information from the base station or other transmitting terminals is transported to the terminals in the form of symbols in an orthogonal frequency division multiplexed format, in which each terminal has means for measuring a channel dispersion and channel phase stability corresponding to multipath signal reception for that terminal and for reporting that dispersion and phase variation measure to the base station or transmitting terminal, and, in which the base station or transmitting terminal is arranged to provide, for a group of terminals respective symbol and prefix lengths on the basis of the dispersion and phase stability measurement of that group of terminals.

According to another aspect of the invention there is provided a method of operating a base station in an orthogonal frequency division multiplex (OFDM) communication system comprising a plurality of terminals served by the base station, the method comprising the steps of:
   i) Receiving an indication of channel dispersion associated with each said terminal;
   ii) classifying said terminals into groups of terminals having a similar channel dispersion; and
   iii) for each group of terminals having a similar channel dispersion, generating on the basis of the dispersion measurements respective symbols and prefixes having appropriate lengths for transmission to the terminals of that group.

According to another aspect of the invention there is provided an OFDM (orthogonal frequency division multiplex) communications signal for use on a channel subject to channel dispersion between a base station and a terminal, said signal comprising a plurality of symbols each having a prefix, and wherein the symbol and prefix lengths are adjusted on the basis of a measure of the dispersion on that channel.

According to another aspect of the invention there is provided a method of communication between peers of a communication network such that that transmitter and receiver are both mobile terminals disposed in respective ad-hoc networks, in which the terminals are arranged to perform channel dispersion measurements, the method comprising: at each terminal, measuring a channel dispersion associated with multipath signal reception for that terminal, and providing for a group of terminals of similar dispersion measurement respective symbol and prefix lengths on the basis of the dispersion measurement of that group of terminals.

In a further embodiment of the invention a subset of the terminals may also inter-communicate as an ad-hoc network as well as to the base station, while a further overlapping subset of terminals may communicate only with each other. In this case the terminals which are transmitting to other terminals have the same properties as, and are functionally equivalent to, a base station.

It will of course be appreciated that although the technique is of particular application to wireless communication systems, it is also applicable to wired systems or to systems using optical transport.

BRIEF DESCRIPTION OF THE DRAWINGS

Preferred embodiments of the invention and the best known method of putting the invention into practice will now be described with reference to the accompanying drawings in which.

DESCRIPTION OF PREFERRED EMBODIMENT

Figure 1:
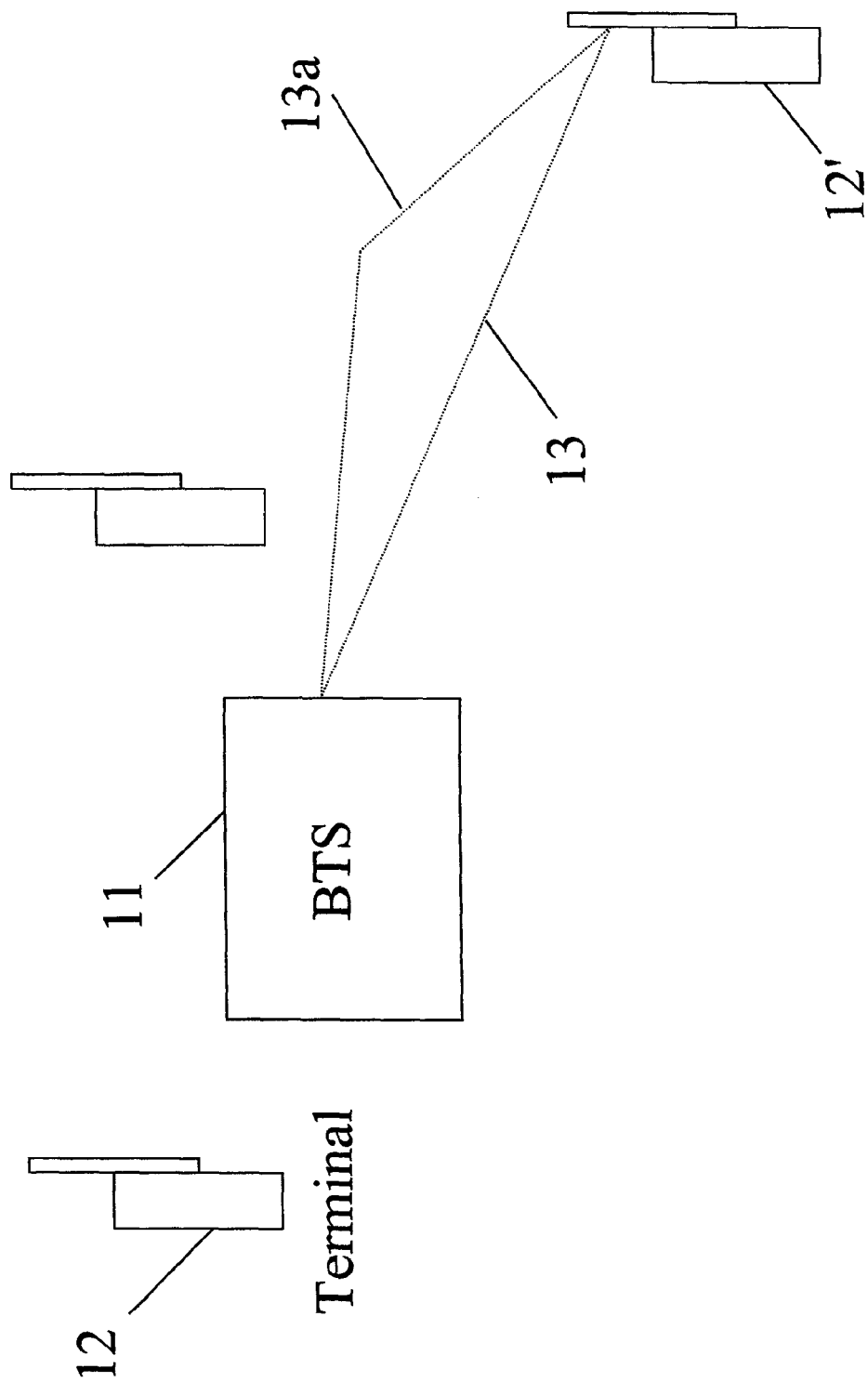
FIG. 1 is a schematic diagram of an OFDM wireless communication system according to a preferred embodiment of the invention.

Referring first to FIG. 1, this depicts in schematic form a wireless communications system in which a base station 11 communicates with a plurality of terminals 12. In the system of FIG. 1, downlink communications from the base station to the terminals are transported in an OFDM (orthogonal frequency division multiplex) format. Although only one base station is depicted in FIG. 1, it will be appreciated that the network may include a plurality of base stations. Further, the functionality of one or more base stations may be provided by an ad hoc group of terminals.

In the system of FIG. 1, transmissions from the base station 11 to the more remote terminals e.g. 12' are subject to multipath or channel dispersion interference. In FIG. 1, a direct path 13 is shown from the base station 11 to the terminal 12', and a second indirect path 13a is shown resulting e.g. from a reflection from a building or a vehicle (not shown). The difference in arrival times of the two signals at the terminal 12' has the potential to cause channel dispersion interference.

Figure 2:
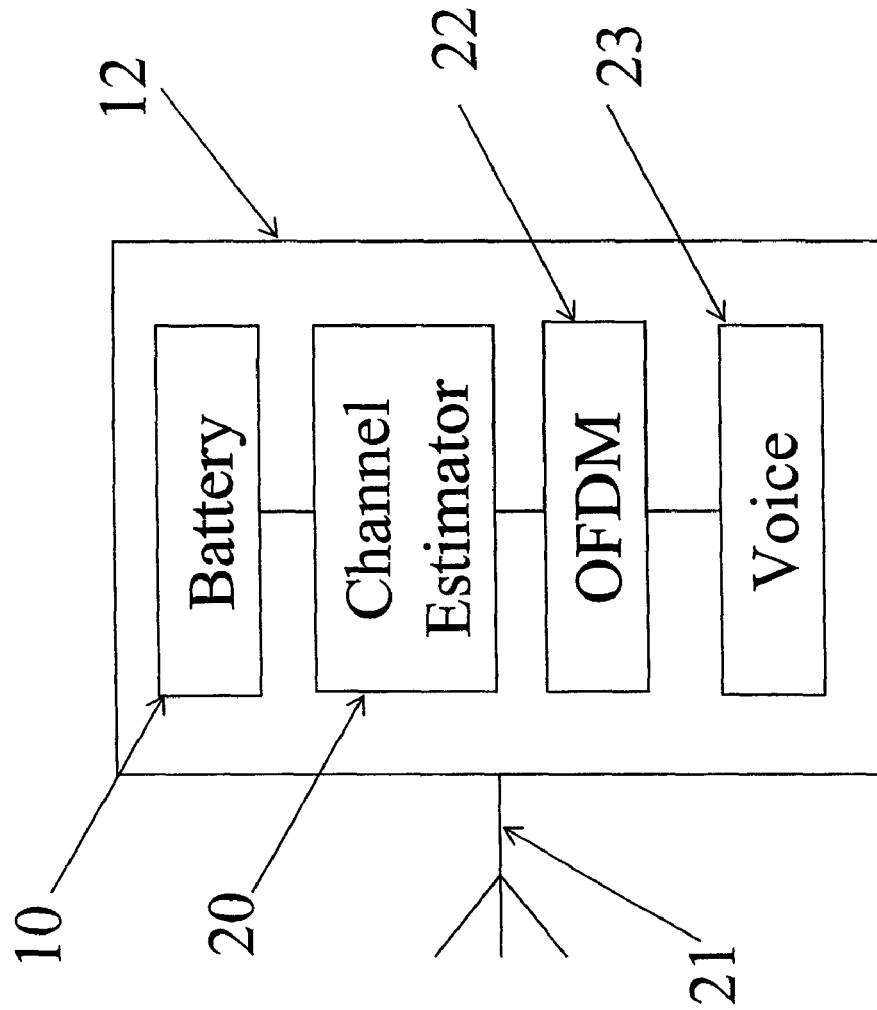
FIG. 2 is a schematic diagram of a terminal for use in the system of FIG. 1.

Referring now to FIG. 2, each terminal 12 served by the base station 11 is powered from a battery 10 or alternative power source and is provided with a channel estimator 20, an OFDM processor 22, and voice processor 23. The terminal may also incorporate data handling, text messaging and video processing facilities (not shown). The channel estimator 20 determines the dispersion resulting from multipath signal reception for that terminal and reports that dispersion measure, together with the terminal identity, via the terminal antenna 21 to the base station 11. In response to that measurement, the base station provides for groups of terminals respective symbol and prefix lengths appropriate to the dispersion measure of that group of terminals. Methods of channel dispersion measurement or channel estimation will be apparent to those skilled in the art.

Figure 3:
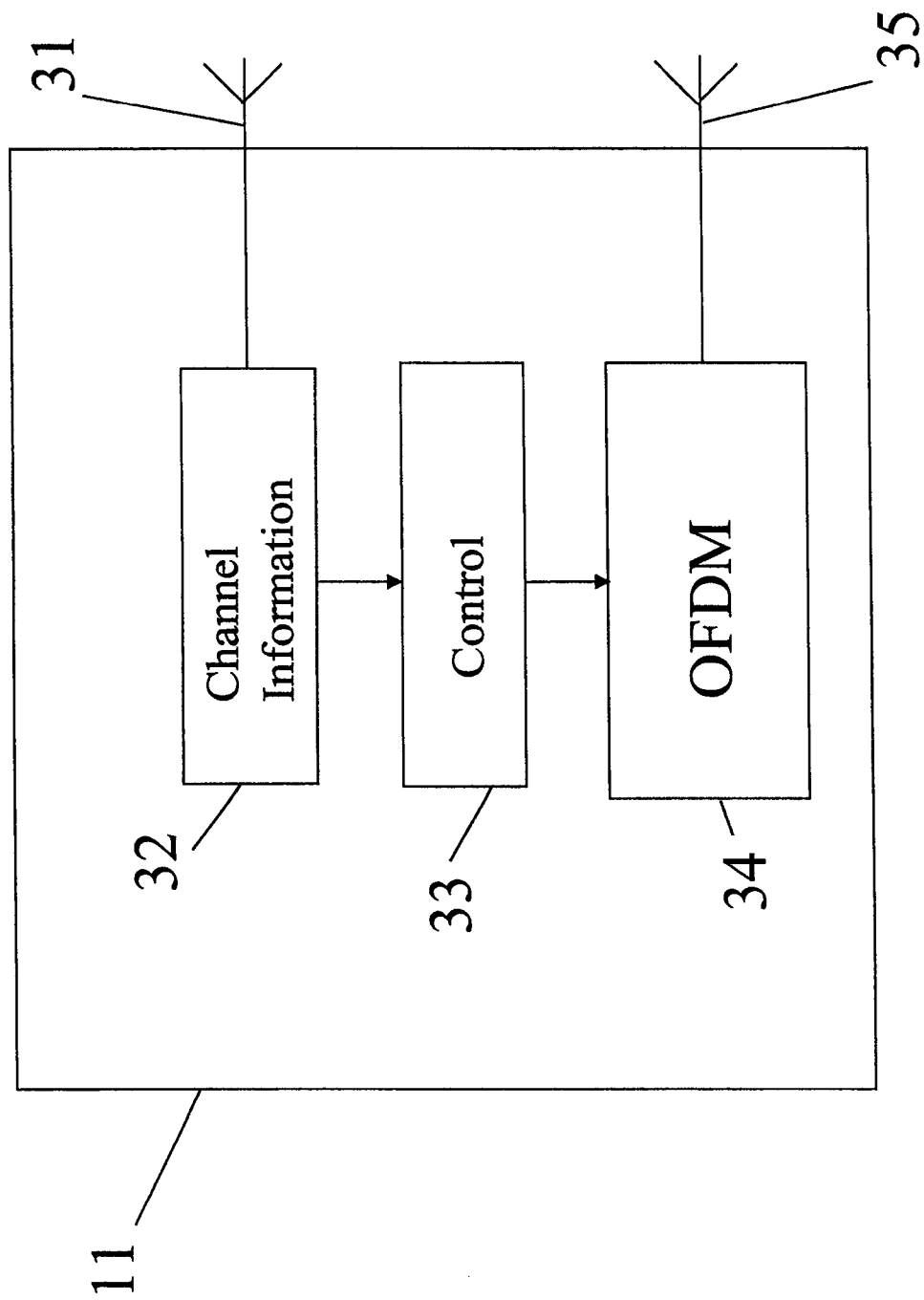
FIG. 3 is a schematic diagram of a base station for use in the system of FIG. 1

Referring now to FIG. 3, this illustrates in schematic form the construction of a base station for use in the network of FIG. 1. It will be appreciated that, for simplicity and clarity, FIG. 3 shows only those parts of the base station as are necessary for the understanding of the invention.

In the base station of FIG. 3, channel information 32 received from the terminals via receive antenna 31 is processed by OFDM control 33 which classifies the system terminals into groups, the terminals of each group having a similar channel dispersion measurement. The OFDM processor 34 provides, in response to the information received from the OFDM control 33 appropriate symbol and prefix lengths for the groups of terminals served by the base station via transmit antenna 35.

Figure 4:
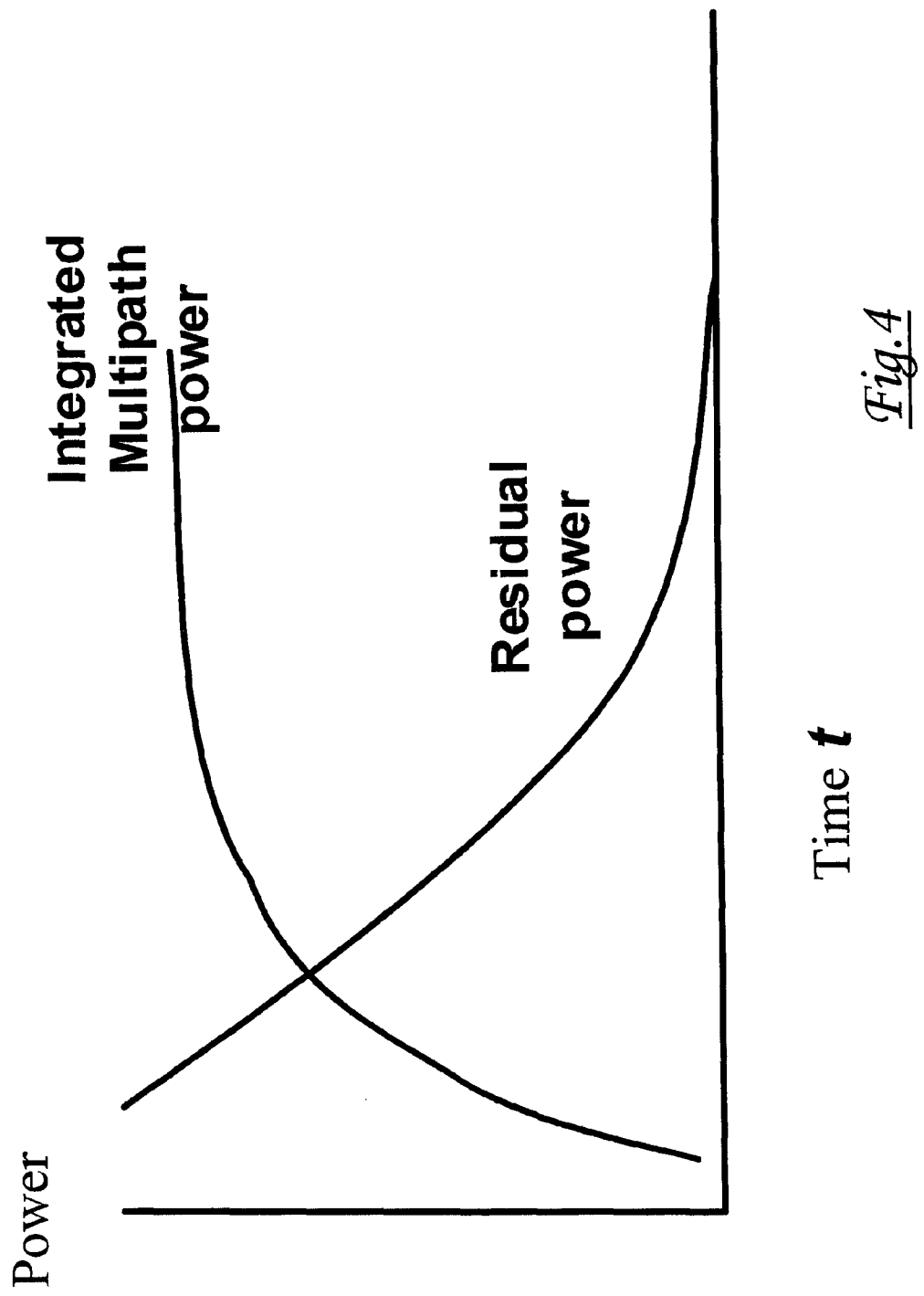
FIG. 4 is a schematic graphical representation of the multipath statistics of the system of FIG. 1.

In our system the set-up for the OFDM modulation is determined by the OFDM processor 34 from the terminal channel dispersion measurements received at the base station via the Channel information 32 and OFDM control 33 by the following method steps:

(i) determine the maximum dispersion of the channel $T_0$.
(ii) choose an acceptable energy loss $\delta$ dB such that the cyclic prefix uses some fraction of the available carrier power. If the prefix has 10% of the symbol duration the loss is around $10 \log_{10}(0.9)$–½ dB.
(iii) Set the prefix length $T_P = T_0$ and the symbol duration $T_S$ to about $10 T_P$.
(iv) Given a channel bandwidth B calculate the number of independent samples $BT_S$ in the symbol
(v) Choose a power of 2 such that $N = 2^m \geq BT$ and use an FFT (fast Fourier transform) of size N for the OFDM modulation This calculation is now related to the statistical nature of the channel multipath. FIG. 4 shows the cumulative multipath power and residual power at a given terminal for the downlink path. For simplicity, this cumulative distribution S(d) is modelled as $$S(d) = 1 - \exp\left(-\frac{d}{T_0}\right) \quad (1)$$

with probability density distribution D(d)

$$D(d) = \frac{1}{T_0}\exp\left(-\frac{d}{T_0}\right) \quad (2)$$

The inter-symbol interference (ISI) power in the symbol is upper bounded by the integral of the tail of D(d) from $T_P$ to ∞ as illustrated in FIG. 4. For unit carrier power the ISI energy $E(T_P)$ which falls within the symbol is given by $$E(T_P) \approx \frac{1}{T_0}\int_{t=T_P}^{\infty}\exp\left(-\frac{t}{T_0}\right)dt = \exp\left(-\frac{T_P}{T_0}\right) \quad (3)$$

while the carrier energy is given by $$C(T_S) = T_S \quad (4)$$

thus the carrier to ISI ratio is given by $$CNR(T_P, T_S) \approx \frac{T_S}{\exp\left(-\frac{T_P}{T_0}\right)} \quad (5)$$

Fixing $T_S = 9T_P$ gives $$SNR(T_P) = 9T_P\exp\left(\frac{T_P}{T_0}\right) \quad (6)$$

If the modulation, ranging from QPSK (Quadrature Phase Shift Keying) to 64 QAM (Quadrature Amplitude Modulation), requires a signal to noise ratio (SNR)=γ dB, then the equation can be solved for $T_P$. Table 1 below shows $T_P$ versus γ for some ITU standard channels. These are the outdoor to indoor and pedestrian A and B models which have rms values of 45 ns for 40% of the time and 750 ns for 55% of the time and the vehicular A and B which have rms dispersions of 370 ns for 40% and 4000 ns for 55% of the time.

TABLE 1

Table I: Duration of prefix (ns) vs rms dispersion to achieve a desired SNR

| | | $T_P$ vs $T_0$ | | | |
|---|---|---|---|---|---|
| γ(dB) | $T_P/T_0$ | $T_0$ = 75 ns | $T_0$ = 370 ns | $T_0$ = 750 ns | $T_0$ = 4000 ns |
| 0 | 0.1 | 7.5 | 37 | 75 | 400 |
| 5 | 0.27 | 20.25 | 99.9 | 202.5 | 1080 |
| 10 | 0.61 | 45.75 | 225.7 | 457.5 | 2440 |
| 15 | 1.13 | 84.75 | 418.1 | 847.5 | 4520 |
| 20 | 1.8 | 135 | 666 | 1350 | 7200 |
| 25 | 2.6 | 195 | 962 | 1950 | 10400 |
| 30 | 3.5 | 262.5 | 1295 | 2625 | 14000 |

There are two features to note from Table 1. The first is the short duration of the prefix required to provide moderate signal to ISI ratios such as coded QPSK or Turbo coding in the range 0 to 5 dB. The second is the large prefix required to provide the higher values of γ which would be required for 64 QAM (−30 dB) in a highly dispersive channel. We have prefix lengths ranging from 7.5 ns to 14 μs, a ratio of $2\times10^3$. This demonstrates that the conventional "one size fits all" prefix strategy is in some difficulty when combined with variable QAM in highly dispersive channels.

Table 2 below shows the FFT size to achieve the required SNR's on average in the given channels.

TABLE 2

Table II: FFT size to achieve γdB SNR on average
in the standard channels

| γ(dB) | $T_0$ = 75 ns | $T_0$ = 370 ns | $T_0$ = 750 ns | $T_0$ = 4000 ns |
|---|---|---|---|---|
| 0 | 1 | 2 | 4 | 32 |
| 5 | 2 | 8 | 16 | 64 |
| 10 | 4 | 16 | 32 | 128 |
| 15 | 4 | 32 | 64 | 256 |
| 20 | 8 | 32 | 64 | 512 |
| 25 | 16 | 64 | 128 | 512 |
| 30 | 16 | 64 | 128 | 1024 |

From the data provided in Table 2, it can be concluded that OFDM is usually overdesigned. The high dispersion (750 ns) outdoor to indoor and pedestrian channel which is thought to model the HSDPA channel only needs a 128 point FFT on average, even to run 64-QAM at 30 dB SNR. In particular, I have found that, by reserving the longer prefixes for those few users who really need them, the symbol lengths can be reduced substantially.

Figure 5:
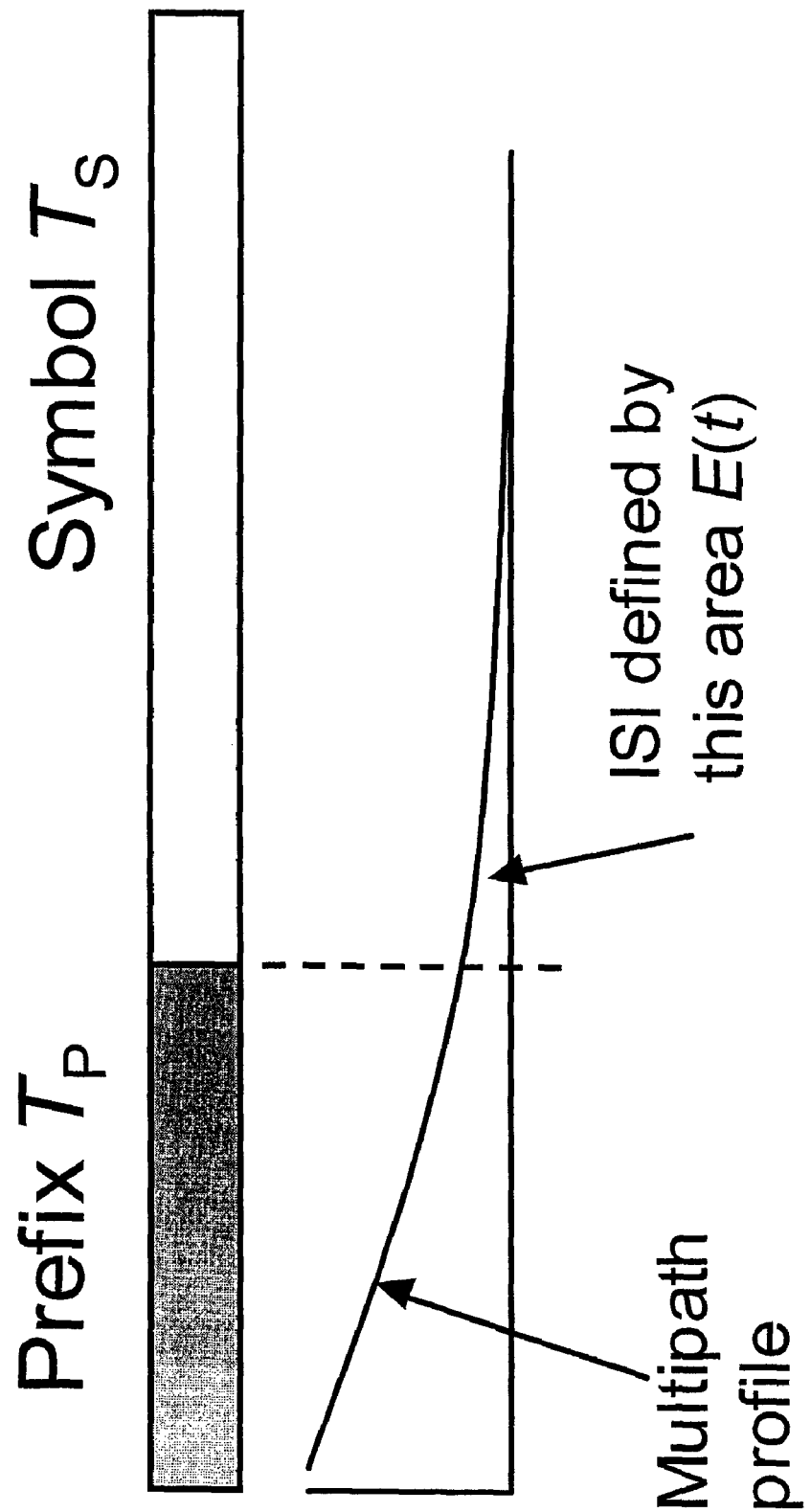
FIG. 5 illustrates a preferred method of determining a ratio of inter-symbol interference (ISI) to carrier power.
Figure 6:
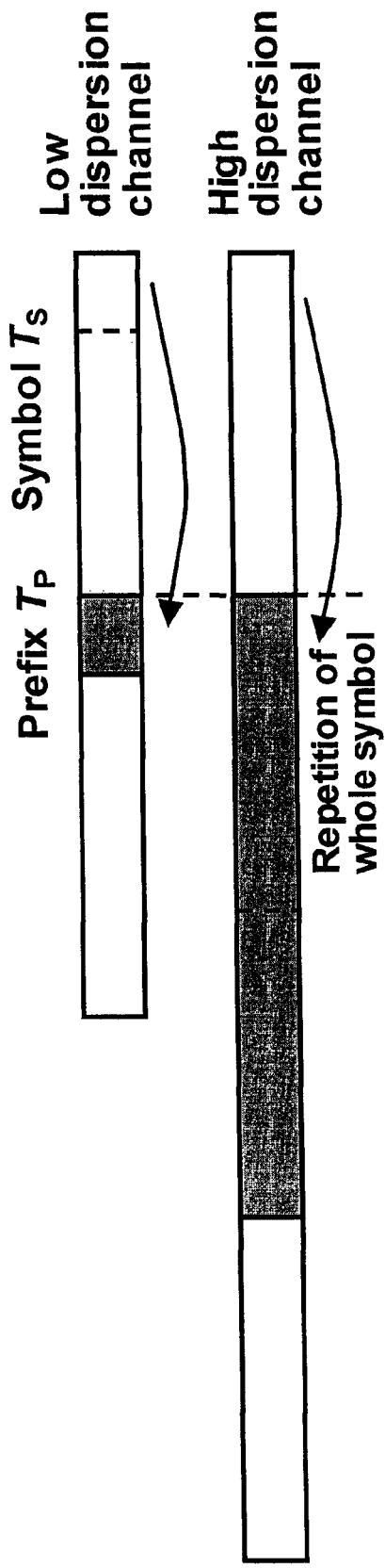
FIG. 6 illustrates a preferred method of determining variable prefix lengths.

In a preferred embodiment, the adaptive OFDM operates by choosing the FFT length for the average channel and varying the prefix length to suit the individual user as is illustrated in FIG. 5. This allows a reduction of the DSP load for all terminals but causes some slight loss in capacity for the infrequent high dispersion channels.

The prefix duration can be determined by feedback of the channel impulse response from the terminal to the base station. Advantageously, when the prefix needed is longer than the symbol then the whole symbol itself may be used several times to extend the symbol length by an integer number of times.

The dilemma of finding an optimum prefix for both types of channel can be circumvented in a further embodiment by providing two classes of terminals; one low cost class with short FFTs and low cost local oscillators designed for portable use; the second class being a semi-portable terminal with the normal OFDM long FFT and high stability local oscillators. Short FFTs are also required when the channel phase suffers from instability or there are high Doppler shifts due to terminal mobility. These two classes of terminal are interoperable with all base stations by suitable signalling.

In a further embodiment, an ad hoc group of mobile terminals may operate together to provide the functional equivalent of a base station, e.g. to form a microcell within a cell. Terminals within such a group may communicate directly with each other or with a system base station.

It will be understood that the above description of a preferred embodiment is given by way of example only and that various modifications may be made by those skilled in the art without departing from the spirit and scope of the invention.

The invention claimed is:

1. A method of communication between one or more base stations and a plurality of terminals served by one or more base stations and in which information from the base station(s) is transported to the terminals in the form of symbols in an orthogonal frequency division multiplexed (OFDM) format, the method comprising: at each terminal, measuring a channel dispersion associated with multipath signal reception for that terminal and reporting that dispersion measure to the base station, and, at the base station(s), providing for a group of terminals of similar dispersion measurement respective symbol and prefix lengths on the basis of the dispersion measurement of that group of terminals.

2. A method of communication between peers of a communication network such that a transmitter and a receiver are both terminals disposed in respective ad-hoc networks, in which the terminals are arranged to perform channel dispersion measurements, the method comprising: at each terminal, measuring a channel dispersion associated with multipath signal reception for that terminal, and providing for a group of terminals of similar dispersion measurement respective symbol and prefix lengths on the basis of the dispersion measurement of that group of terminals.

3. A method of communication between a base station and a set of terminals such that a subset or all of the terminals have formed an ad-hoc network and the same or a different subset are also in communications with one or more base stations, the method comprising: at each terminal, measuring a channel dispersion associated with multipath signal reception for that terminal and reporting that dispersion measure to the base station, and, at the base station(s), providing for a group of terminals of similar dispersion measurement respective symbol and prefix lengths on the basis of the dispersion measurement of that group of terminals.

4. A method as claimed in claim 1, wherein at least one said base station is functionally comprised by a group of terminals.

5. A method as claimed in claim 4 wherein each terminal measures the phase stability of the channel and reports that measurement back to one or more base stations or to other terminals which are transmitting to it in order that the base station or the other terminals can select a symbol duration which is short enough that the channel can be considered to be static for the duration of each symbol.

6. A method as claimed in claim 5, wherein the transmission from the base station to the groups of terminals, or between terminals, has a time division multiple access (-DMA) structure.

7. A method as claimed in claim 1, wherein the symbol length is selected to be short or comparable to the time for which the phase of the channel can be considered to be stable.

8. A method as claimed in claim 1, wherein the symbol length is about ten times the prefix length.

9. A method as claimed in claim 5, wherein, when the prefix needed is longer than the symbol, the symbol itself is used several times to extend the symbol length by an integer number of times.

10. A communications system comprising a base station, and a plurality of terminals served by that base station, in which information from the base station is transported to the terminals in the form of symbols in an orthogonal frequency division multiplexed format, in which each terminal has means for measuring a channel dispersion corresponding to multipath signal reception for that terminal and for reporting that dispersion measure to the base station, and, in which the base station is arranged to provide, for a group of terminals of similar dispersion measurement respective symbol and prefix lengths on the basis of the dispersion measurement of that group of terminals.

11. A communications system as claimed in claim 10, wherein the symbol length is about ten times the prefix length.

12. A communications system as claimed in claim 10, wherein the symbol length is selected to be short or comparable to the time for which the phase of the channel can be considered to be stable.

13. A communications system comprising one or more base stations, and a plurality of terminals served by that one or more base stations, and wherein some of the terminals have formed an ad-hoc network in which information from the base station or other transmitting terminals is transported to the terminals in the form of symbols in an orthogonal frequency division multiplexed format, in which each terminal has means for measuring a channel dispersion and channel phase stability corresponding to multipath signal reception for that terminal and for reporting that dispersion and phase variation measure to the base station or transmitting terminal, and, in which the base station or transmitting terminal is arranged to provide, for a group of terminals of similar dispersion measurement respective symbol and prefix lengths on the basis of the dispersion and phase stability measurement of that group of terminals.

14. A communications system as claimed in claim 13, wherein the transmission from the base stations to the groups of terminals or within an ad-hoc network of terminals has a time division multiple access (TDMA) structure.

15. A base station for use in a communications system in which information from the base station is transported to the terminals in the form of symbols in an orthogonal frequency division multiplexed format, the base station comprising; means for receiving channel dispersion measurements and rate of channel phase variations from terminals served by the base station, and means for providing, for groups of terminals having similar channel dispersion and phase variations, respective symbol and prefix lengths on the basis of the dispersion and phase variation measurements of that group of terminals.

16. A method of operating a base station in an OFDM (orthogonal frequency division multiplex) communication system comprising a plurality of terminals, some of which may form an ad-hoc network, the method comprising the steps of: receiving an indication of channel dispersion and channel phase change rates associated with each terminal; and for groups of terminals having similar channel dispersion and phase change rate, generating respective symbol and prefix lengths on the basis of the dispersion measurements of that group of terminals.

17. The method as claimed in claim 9, wherein the method is a computer program embodied in the form of software in machine readable form on a non-transitory storage medium.

18. A non-transitory computer readable medium encoded with a computer program comprising instructions for carrying out a method when the computer program is executed on a computer system, wherein the method is a method of communication between one or more base stations and a plurality of terminals served by one or more bases stations and in which information from the base station(s) is transported to the terminals in the form of symbols in an orthogonal frequency division multiplexed (OFDM) format, the method comprising: at each terminal, measuring a channel dispersion associated with multipath signal reception for that terminal and reporting that dispersion measure to the base station, and, at the base station(s), providing for a group of terminals of similar dispersion measurement respective symbol and prefix lengths on the basis of the dispersion measurement of that group of terminals.

\* \* \* \* \*